UNITED STATES PATENT OFFICE.

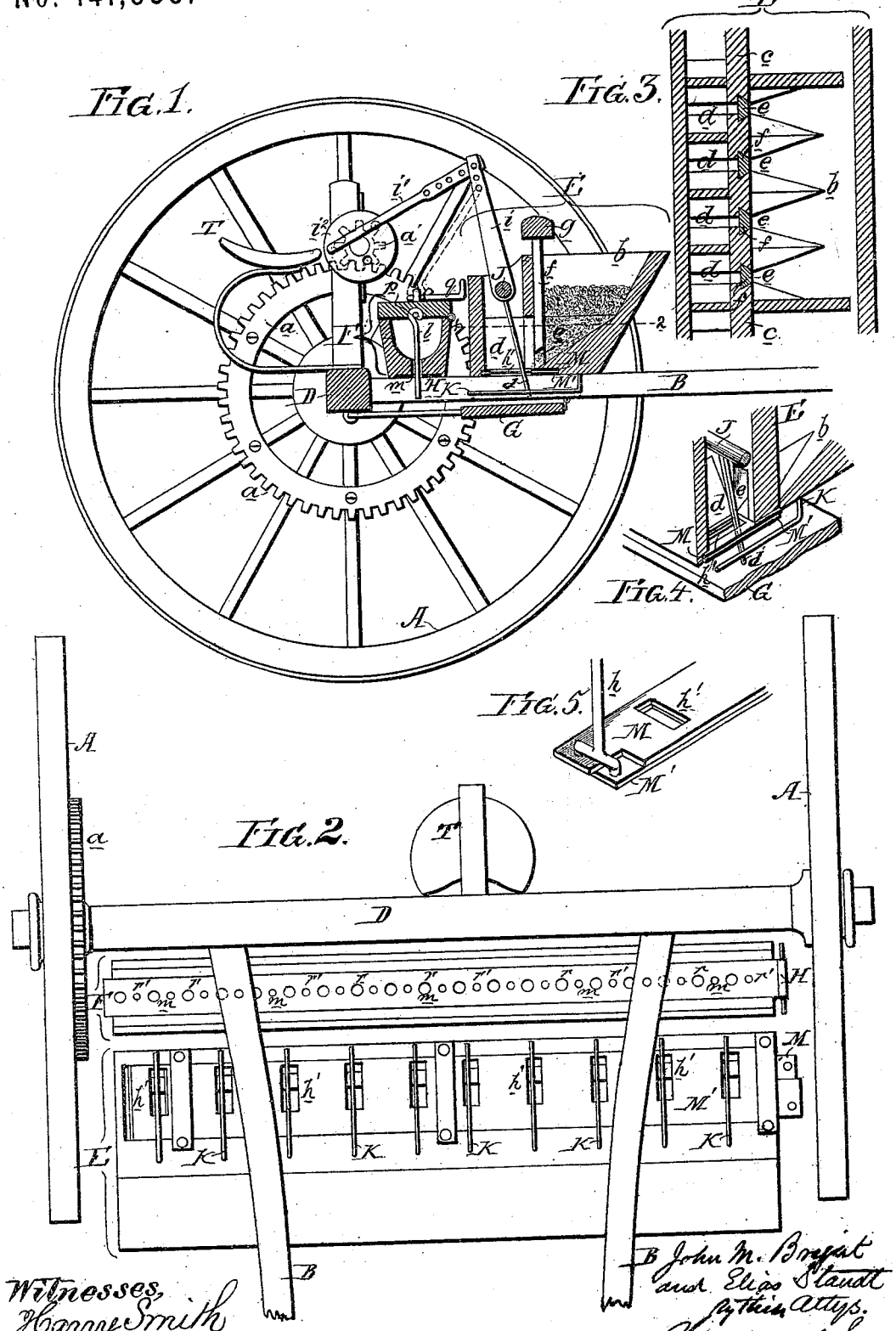

JOHN M. BRIGHT AND ELIAS STANDT, OF BERNVILLE, PENNSYLVANIA.

IMPROVEMENT IN PLANTING-MACHINES.

Specification forming part of Letters Patent No. 141,538, dated August 5, 1873; application filed March 15, 1873.

*To all whom it may concern:*

Be it known that we, JOHN M. BRIGHT and ELIAS STANDT, both of Bernville, Berks county, Pennsylvania, have invented an Improved Planting-Machine, of which the following is a specification:

The object of our invention is a machine for sowing the various kinds of grain and timothy and other small seeds, either broadcast or in rows.

The machine is constructed in the manner which we will now proceed to describe, reference being had to the accompanying drawing, in which—

Figure 1 is a sectional elevation; Fig. 2, an inverted plan view; Fig. 3, a sectional plan on the line 1 2, Fig. 1; and Figs. 4 and 5, perspective views of portions of the machine.

The machine is mounted upon wheels A A, one of which serves as a driver, and has secured to its inner face a cog-wheel, $a$; and the shafts B B, which are secured to the axle D, support the seed-receptacles and operating parts of the machine, a seat, T, being provided at the rear of the latter for the operator. The seed-receptacles E and F extend transversely across the machine, one directly at the rear of the other, and occupy nearly the whole of the space between the wheels in advance of the axle. The receptacles E are intended especially for wheat, oats, and other kinds of grain, and are constructed as follows: In front there is a row of hoppers, $b$, separated by a partition, $c$, from a row of smaller hoppers, $d$, of which there are, in the present instance, four for each hopper $b$. (See Fig. 3.) There is an opening, $e$, in the partition $c$ for each hopper $d$, which can be wholly or partially closed by a valve, $f$, the whole number of valves being connected at the top by a cross-bar, $g$, so that all may be operated simultaneously, and the size of the openings $e$ thus regulated uniformly to accord with the character of the grain and with the quantity which is to be passed through from the larger into the smaller hoppers. Two guided plates, M M', one arranged to slide upon the other, form the bottoms of the hoppers $d$. They are operated by a double crank-shaft, $h$, Fig. 5, in such a manner as to contract or enlarge opposite openings $h'$ in the said plates, of which there is one set for each hopper. A rock-shaft, J, operated through the medium of an arm, $i$, connecting-rod $i^1$, and crank-wheel $i^2$, from a pinion, $a'$, driven by the cog-wheel $a$, before referred to, extends transversely over the hoppers $d$, and from this shaft an arm, $j$, Fig. 4, extends downward through each of the openings $h'$ in the bottoms of the said hoppers. (See Figs. 1 and 5.) Directly beneath the openings $h'$ is a series of light rods, K, fixed to the bottoms of the hoppers $b$, and beneath these rods is a flat plate or strip, G, slightly lower at its rear than at its front edge, and extending transversely across the machine and beneath the whole number of hoppers. The grain passes from the hoppers $b$ through the openings $e$ into the hoppers $d$, but not in too great quantity to clog the openings $h'$, through which the grain escapes and falls onto the plate G, the reciprocating arm $j$ keeping the openings $h'$ clear, and acting, also, in conjunction with the rods K, to distribute the grain over the surface of the plate G, so that when shaken from the rear edge of the latter onto the ground it may be distributed very evenly or sown broadcast much more uniformly than is possible by hand.

The reciprocating arms $j$ will be found especially useful in sowing oats, which, without the said rods, would inevitably become clogged in the openings $h'$.

For sowing timothy, clover, and other small seeds, which is often done simultaneously with grain, I employ the receptacle F and its appurtenances. These consist of a series of rods, $l$, extending into the holes $m$ in the bottom of the receptacle, and serving as plungers to force the seed through, the said rods being hung to the hinged lid $p$ of the box, to which a reciprocating movement is imparted by means of a rod, $q$, connecting it with the arm $i$. A sliding plate, H, extends beneath the receptacle F, and is provided with alternate large and small holes $r$ and $r'$, (Fig. 2,) either of which, by an adjustment of the said plate, can be brought opposite the holes $m$, according as the seed to be planted is large or small. The holes in the bottom of the receptacle F are so close together that the seed falling from the same will be sown broadcast rather than in rows, but this result may be attained positively by arranging an inclined distributing-plate beneath the same similar to the plate G. The receptacle F may be continuous, or it may be separated into a series of hoppers.

By simply attaching tubes to the machine opposite the holes through which the seed is dropped, it may be adapted for drilling or planting in rows.

We claim as our invention—

1. The compound receptacle E, consisting of two sets of hoppers, $b$ $d$, of equal length, communicating through a series of openings, $e$, each provided with a valve, $f$, as set forth.

2. The combination of the reciprocating arms $j$ and fixed rods K, arranged and operating so as to distribute the grain, as set forth.

3. The combination, with the slotted plates M M', placed one above the other, of the double crank-shaft $h$, operating both plates, as set forth.

4. The receptacle F provided with a series of rods or plungers, $l$, adapted to the openings $m$ in the bottom of the said receptacle, and connected to the hinged lid of the latter so as to be simultaneously operated by the reciprocation of the same, substantially as herein described.

In testimony whereof we have signed our names to this specification in the presence of two subscribing witnesses.

JOHN M. BRIGHT.
ELIAS STANDT.

Witnesses:
BENTON K. BRIGHT,
SIMON RIEGEL.